United States Patent [19]

Citta et al.

[11] Patent Number: 5,128,757
[45] Date of Patent: Jul. 7, 1992

[54] VIDEO TRANSMISSION SYSTEM USING ADAPTIVE SUB-BAND CODING

[75] Inventors: Richard W. Citta, Oak Park; Stephen M. Dicke, Wheeling, both of Ill.

[73] Assignee: Zenith Electronics Corporation, Glenview, Ill.

[21] Appl. No.: 539,770

[22] Filed: Jun. 18, 1990

[51] Int. Cl.⁵ .............................................. H04N 7/12
[52] U.S. Cl. ....................................... 358/133; 358/141
[58] Field of Search ................ 358/141, 133, 142, 147

[56] References Cited

U.S. PATENT DOCUMENTS

| | | | |
|---|---|---|---|
| 4,179,709 | 12/1979 | Workman | 358/133 |
| 4,375,650 | 3/1983 | Tiemann | 358/133 |
| 4,504,860 | 3/1985 | Nicol et al. | 358/133 |
| 4,646,135 | 2/1987 | Eichelberger et al. | 358/147 X |
| 4,646,149 | 2/1987 | Wojnarowski et al. | 358/133 X |
| 4,734,767 | 3/1988 | Kaneko et al. | 358/133 |
| 5,001,561 | 3/1991 | Haskell et al. | 358/133 |
| 5,010,402 | 4/1991 | Nishino | 358/133 |

*Primary Examiner*—Victor R. Kostak

[57] ABSTRACT

A video signal having a bandwidth on the order of 37 MHz is subjected to adaptive sub-band coding for transmission through a standard 6 MHz NTSC television channel. During each frame of the video signal a plurality of blocks of sub-band coefficients, each block representing the spectral content of a corresponding portion of the video image, are derived. The energy distribution of each block of coefficients is analyzed in a plurality of different spatial directions to establish a perceptual coding classification for each coefficient block. The coefficients are then variably quantized, e.g. truncated, in dependence upon the classification established for the corresponding block to reduce the required transmission bandwidth without introducing significant visible artifacts in the reproduced video image.

45 Claims, 12 Drawing Sheets

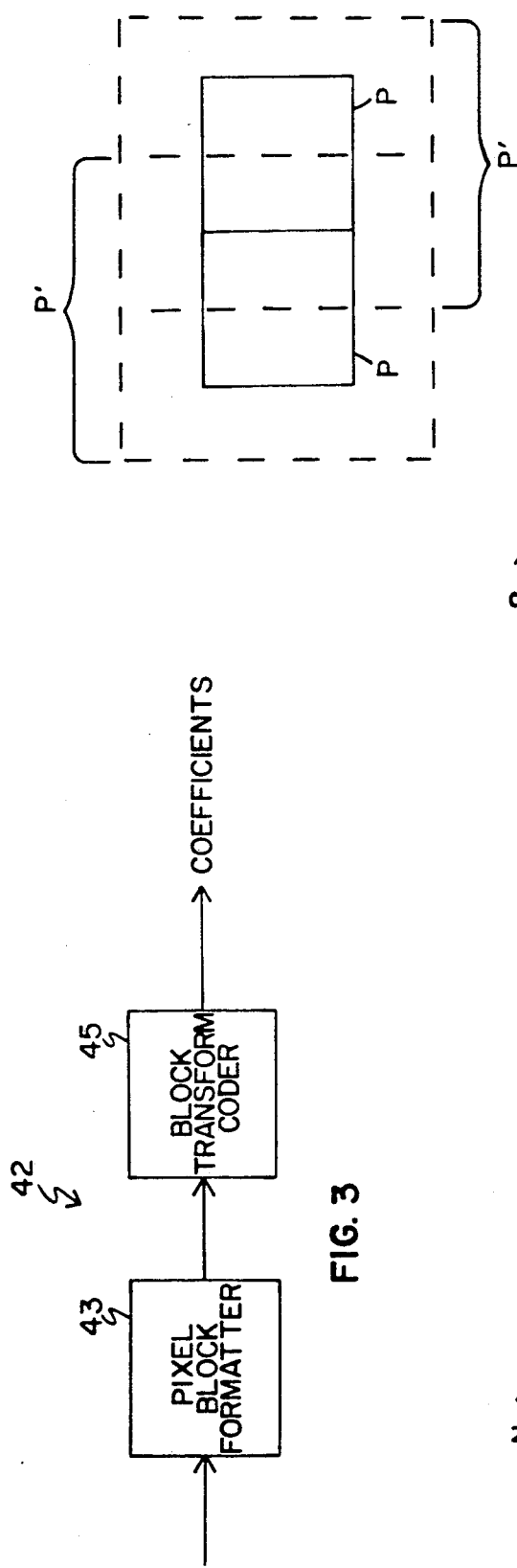
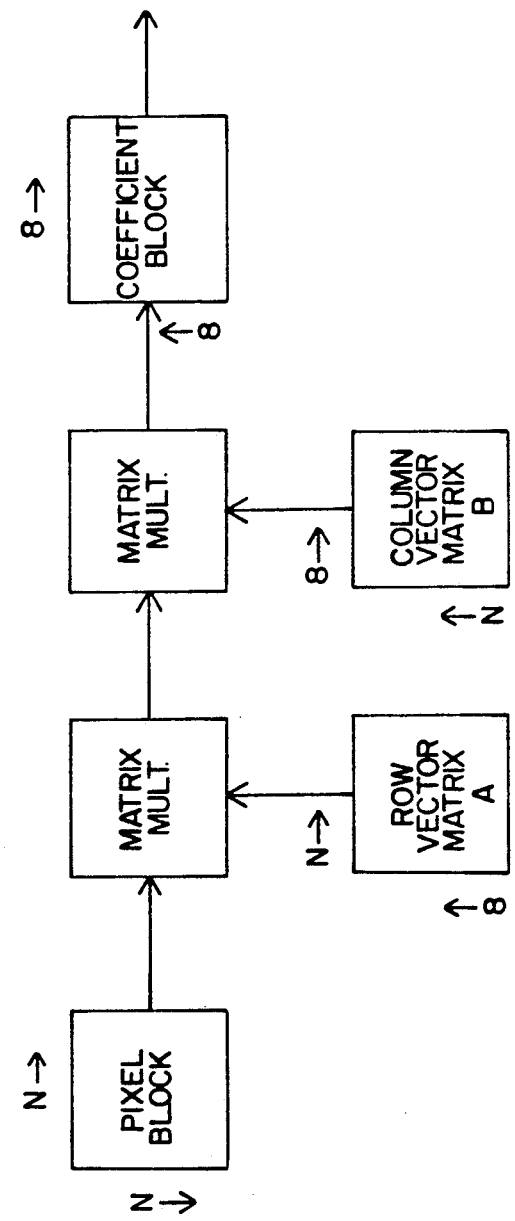
FIG. 4A
FIG. 3
FIG. 4

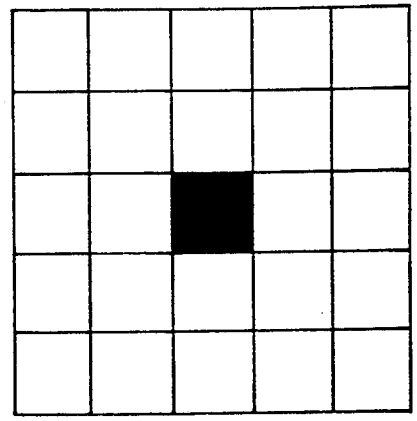
FIG. 9A
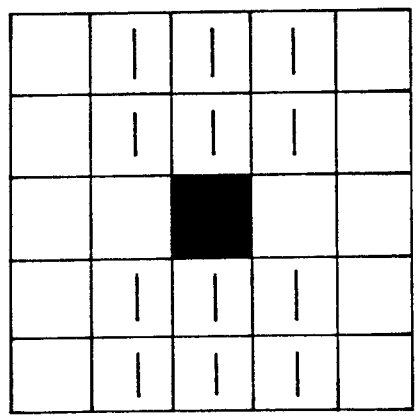 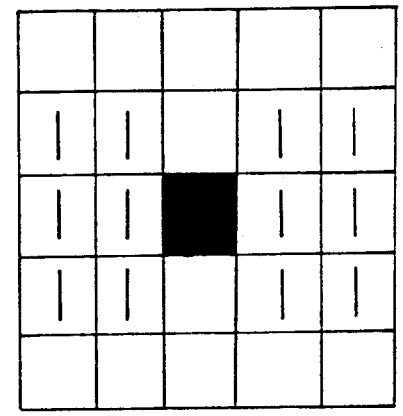
FIG. 9B
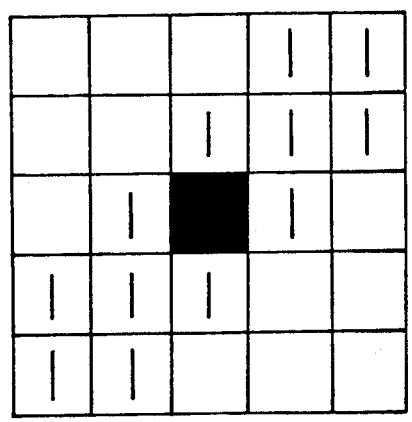  OR  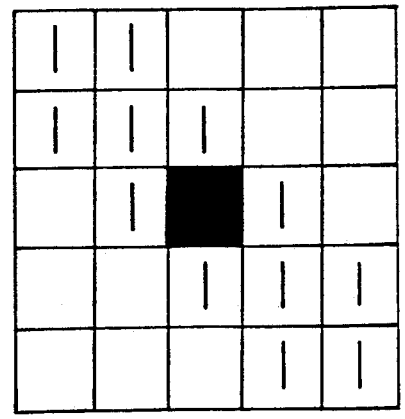
FIG. 9C

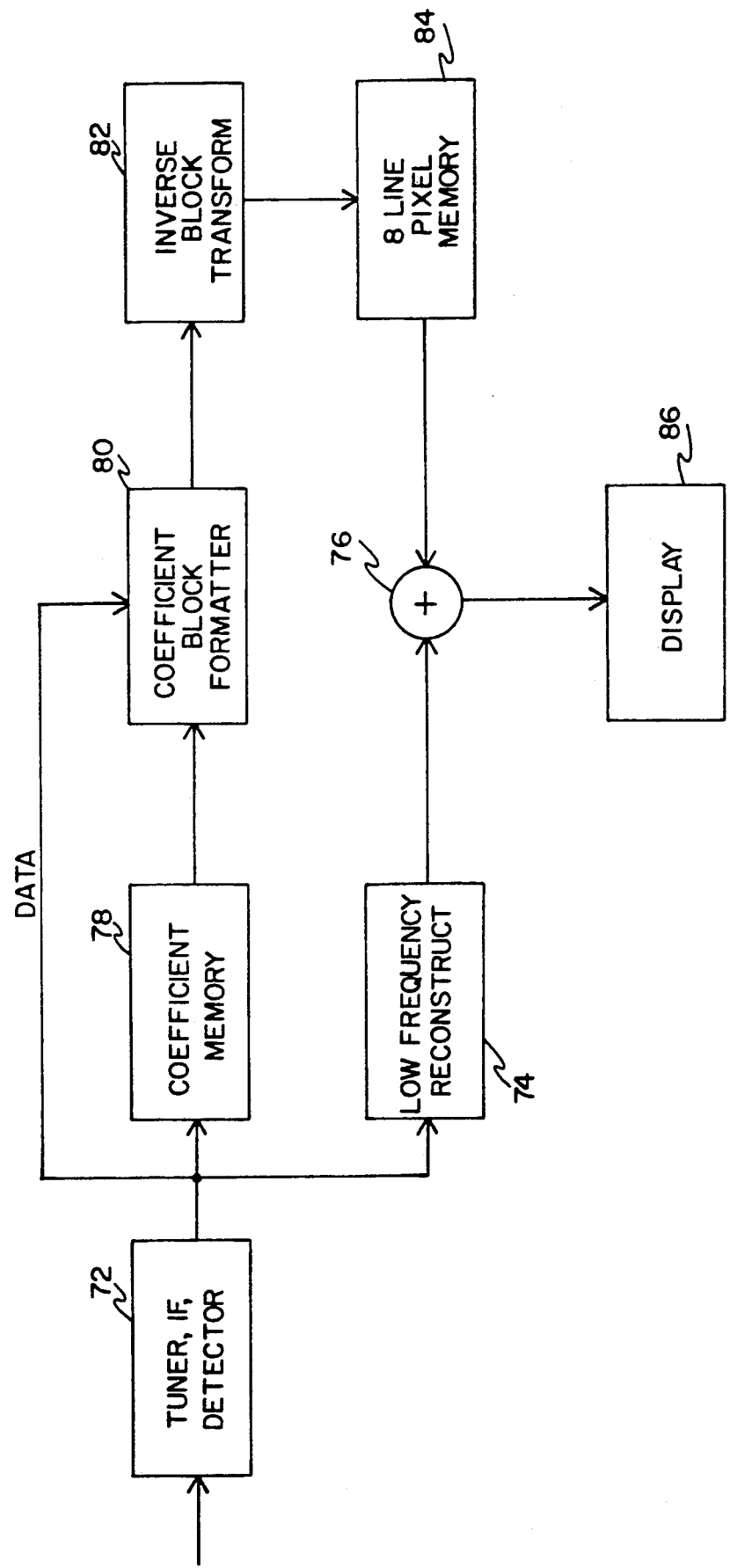
FIG. II 5,128,757

VIDEO TRANSMISSION SYSTEM USING ADAPTIVE SUB-BAND CODING

BACKGROUND OF THE INVENTION

The present invention relates to video encoding and decoding systems and particularly concerns a video compression system employing adaptive sub-band coding.

Adaptive sub-band coding is a process which has been frequently proposed for compressing a wide band video signal to enable its transmission through a channel of limited bandwidth, such as a standard 6 MHz television channel. See, for example, the article by Paul A. Wintz entitled "Transform Picture Coding" in the Proceedings of the IEEE, Vol. 60, No. 7, pages 809-820, July, 1972. Sub-band coding as the term is used herein, refers generally to a process wherein a video image signal is converted into a plurality of spectral coefficients representative thereof and may be effected either by spatially filtering the video signal or by subjecting it to a suitable block transform, such as the discrete cosine transform (DCT). In either case, the video signal is separated into a plurality of sub-bands each comprising a series of coefficients, with the coefficients derived for each sub-band representing a different spectral component of a respective portion of the image corresponding to the video signal.

The sub-band coefficients are subsequently processed in accordance with a data compression algorithm whereby the coefficients are normally quantized or truncated based on the source statistics of typical video image signals. Use of these types of algorithms is typically referred to as "source coding". In particular, since it has been found that most of the video information is contained in the lower order sequency domain coefficients, these coefficients are normally quantized to provide relatively high resolution, while the higher order sequency domain coefficients are quantized to provide relatively low resolution. In the cases where coefficient truncation is effected, the lower order coefficients are truncated less heavily than the higher order coefficients.

Thus, for example, the lowest order coefficients may be quantized with eight-bit resolution, the next highest order coefficients with six-bit resolution, and so on. While this technique achieves a certain degree of compression, it is often necessary to further compress the coefficients before transmission. Further compression may be achieved by deriving a so-called "activity function" which provides a measure of the AC energy in respective portions of the video image. Since larger errors can be tolerated in portions of the video image producing a large activity function, the degree of quantization in these areas can be reduced, thereby further reducing the amount of data required for transmission. For example, if a particular portion of the video image is characterized by a relatively large activity function, the quantization of the lowest order coefficients derived therefor may be reduced from eight bits to six bits, the next highest order coefficients from six bits to four bits, and so on.

Adaptive sub-band coding systems of the foregoing type can achieve substantial levels of data compression, but often at the expense of producing undesired artifacts in the reproduced video image. These artifacts are largely the result of the arbitrary nature in which the data compression algorithms effect quantization of the sub-band coefficients. In particular, the use of prior art source coding quantization algorithms results in the over and under quantization of the various coefficients to such an extent that the information represented by the transmitted coefficients is inadequate to enable reproduction of the video image without significant visible artifacts.

The present invention provides an improved system for variably quantizing or truncating the sub-band coefficients in a manner such that visible artifacts in the reproduced video image are greatly minimized. Tee system is based on perceptual coding criteria which may be used to quantize or truncate the sub-band coefficients in conformance with the response of the human eye to different classifications of video images.

OBJECTS OF THE INVENTION

It is a basic object of the invention to provide a novel transmission system for video images.

It is another object of the invention to provide an improved adaptive sub-band coding system for video images.

It is a further object of the invention to provide an adaptive sub band coding system in which artifacts in the reproduced video image are greatly reduced.

It is yet a further object of the invention to provide an adaptive sub-band coding system for video images based on perceptual coding criteria.

BRIEF DESCRIPTION OF THE DRAWINGS

These and other objects and advantages of the invention will be apparent upon reading the following description in conjunction with the drawings, in which:

FIG. 3 is a block diagram of an alternate embodiment of the adaptive sub-band coder 40 of FIG. 1;

FIGS. 4 and 4A are diagrams illustrating the operation of block transform coder 45 of FIG. 3;

FIGS. 9(A)-9(C) are graphical depictions of a series of contiguous coefficient blocks useful in understanding the algorithm of FIGS. 8(A) and 8(C);

FIG. 11 is a block diagram showing one embodiment of FIG. 1 in more detail; and

DESCRIPTION OF THE PREFERRED EMBODIMENTS

Figure 1:
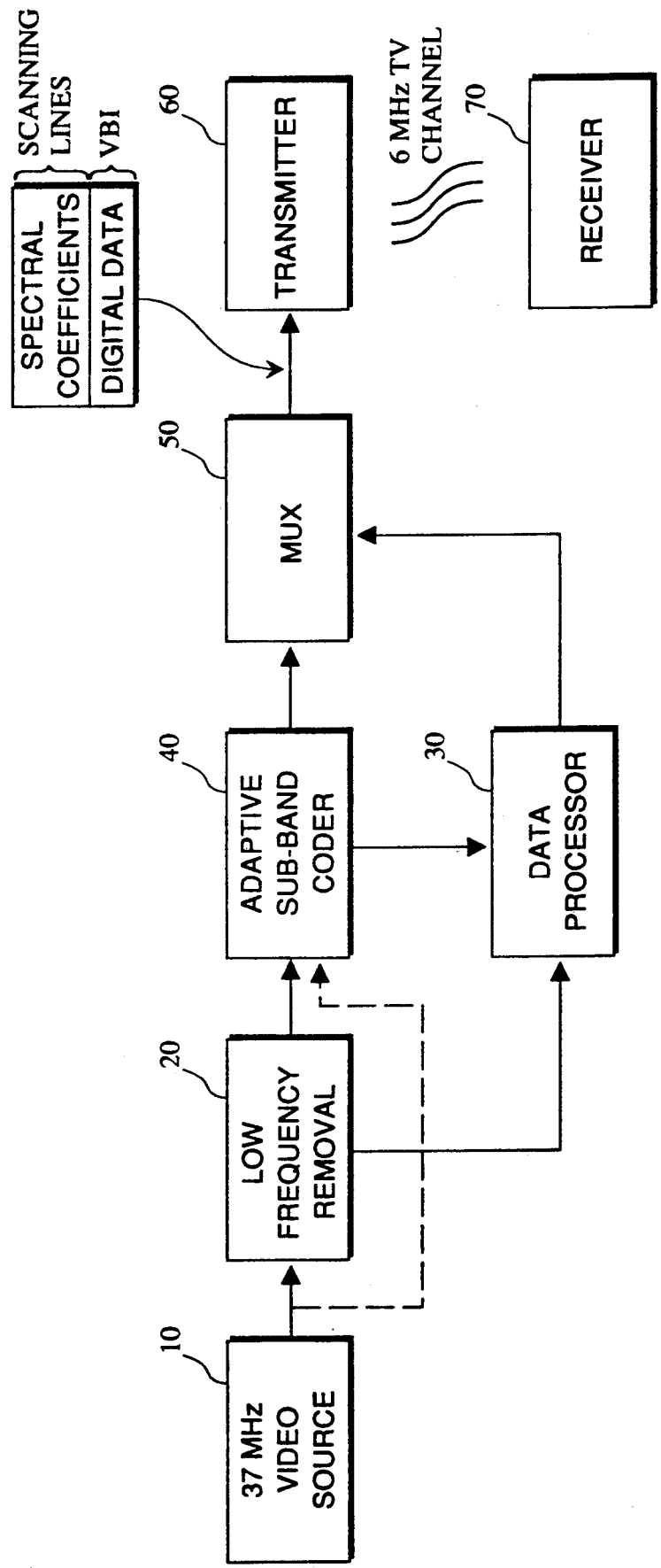
FIG. 1 is a block diagram of a video transmission system employing adaptive sub-band coding in accordance with the invention.

FIG. 1 illustrates an exemplary video signal transmission system in which the adaptive sub-band coding techniques of the present invention may be employed. A video source 10 provides a video signal which may have a bandwidth of about 37 MHz. Although not necessarily limited thereto, source 10 preferably provides a progressively scanned video signal in the form of successive frames having a vertical periodicity equal to the NTSC standard and a horizontal periodicity equal to three times the NTSC standard. The video signal provided by source 10 is applied to a low frequency removal circuit 20 of the type disclosed in copending application Ser. No. 238,956 filed Aug. 31, 1988. Low frequency removal circuit 20 extracts a relatively high energy content, low frequency component (for example, the frequencies below up to about 1 MHz) from the video signal provided by source 10 and supplies a digital representation thereof to a data processing circuit 30. Data processing circuit 30 is preferably an adaptive delta modulation data processor of the type disclosed in copending application Ser. No. 453,525, filed Dec. 20, 1989.

The high frequency component of the video source signal, which is characterized by a relatively low energy content, is coupled from low frequency removal circuit 20 to an adaptive sub-band coder 40 which will be described in more detail hereinafter. For now, it is sufficient to say that sub-band coder 40 develops a sequency domain signal comprising a stream of spectral coefficients representing the high frequency video component and having a bandwidth compatible with a standard 6 MHz television channel. Sub-band coder 40 also supplies a data signal to data processor 30 representing the quantization or truncation operation effected by the sub-band coder. The stream of coefficients from adaptive sub-band coder 40 and an output of data processor 30 are coupled to respective inputs of a multiplexer 50 where they are combined in a time division multiplexed (TDM) format. In particular, the TDM signal has a periodic structure corresponding to a standard NTSC field with the digital data occupying the lines thereof corresponding to the VBI and the sub-band coefficients occupying the remaining active scanning lines. In the presently preferred embodiment, the sub-band coefficients are provided to multiplexer 50 from sub-band coder 40 in an analog form although the coefficients may alternatively, be provided in digital form.

The TDM signal provided by multiplexer 50 is applied to a transmitter 60 by which it is transmitted over a standard 6 MHz television channel for reception by a receiver 70. Receiver 70, which will be described in further detail hereinafter, reproduces a representation of the original 37 MHz video image in response to the received sub-band coefficients and data signal. The video image is preferably reproduced in the form of a progressively scanned display with successive frames having a vertical periodicity equal to the NTSC standard and a horizontal periodicity equal to three times the NTSC standard.

Figure 2:
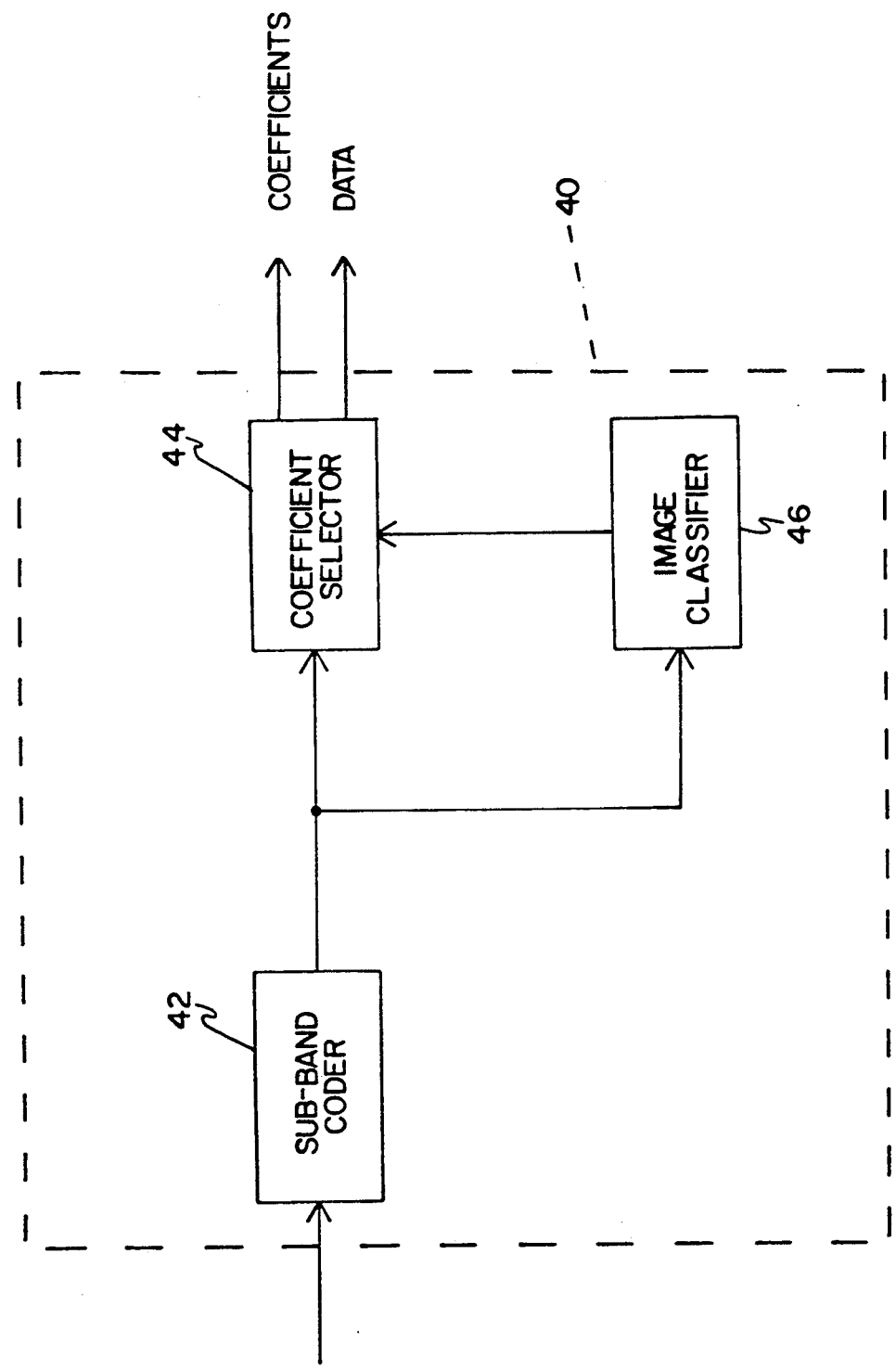
FIG. 2 is a block diagram showing the adaptive sub-band coder 40 of FIG. 1 in more detail.

FIG. 2 shows adaptive sub-band coder 40 in more detail. The high frequency component of the video source signal is applied to a sub-band coder 42, which may be implemented either as an arrangement of spatial filters, such as a quadrature mirror filter bank, or as a block transform coder. In either case, sub-band coder 42 separates each frame of the high frequency component of the video image into a plurality of sub-bands each of which is represented by a series of sub-band coefficients. The coefficients are preferably grouped in blocks with each block including a single coefficient from each sub-band such that each block of coefficients represents a respective spatial portion of a frame of the high frequency component of the video image. For example, in the presently preferred embodiment of the invention, each frame of the video image is represented by 14,400 blocks of coefficients with each block comprising 64 individual spectral coefficient terms.

The sub-band coefficients developed by sub-band coder 42 are applied to a sub-band coefficient selector 44 and to an image classifier 46. Coefficient selector 44 and image classifier 46 operate together to either quantize or truncate the coefficients developed by sub-band coder 42 to reduce the bandwidth required for their transmission. Specifically, a bandwidth reduction of about 6:1, from 37 MHz to 6 MHz is required. In the presently preferred embodiment, the coefficients are transmitted as an analog signal whereby selective bandwidth reduction is effected by coefficient truncation; i.e., a given coefficient is either transmitted at full resolution or is not transmitted at all. In a digital implementation, bandwidth reduction may be effected by selective quantization; i.e., selectively increasing or decreasing the resolution of the various coefficients.

As mentioned previously, sub-band coder 42 can be implemented using either block transform techniques or spatial filters with substantially identical results. The transform implementation effects a matrix multiplication in which the number of rows and columns of the matrices correspond to the number of filters and filter taps in the filter implementation. In particular, in the transform implementation, separable transforms are preferably employed to derive a plurality of transform coefficients as the result of the matrix multiplication APB, where A is an (M×N) matrix of row vectors, P is an (N×N) block of pixels and B is an (N×M) matrix of column vectors. A corresponding set of coefficients can be derived by using a suitable quadrature mirror filter bank comprising M filters each having N taps, with suitable subsampling.

For the transform coding implementation of the invention, sub-band coder 42 comprises a pixel block formatter 43 and a block transform coder 45 as shown in FIG. 3. The high frequency component of the video source signal is applied to pixel block formatter 43 which formats the received signal into a successive series of (N×N) pixel blocks as shown in FIG. 4. The (N×N) pixel blocks are successively applied to block transform coder 45 to derive a block of transform coefficients for each processed pixel block. In the preferred embodiment of the invention, each frame of the video image comprises an array of 1280×720 pixels which are transformed into a series of 14,400 (8×8) coefficient blocks. In particular, block transform coder 45 implements a separable transform coding process wherein, each (N×N) pixel block is initially multiplied with an (8×N) row vector matrix A, the resultant matrix being multiplied by an (N×8) column vector matrix B to obtain a block of (8×8) coefficients (see FIG. 4). Each (8×8) block of coefficients may be derived on the basis of a corresponding block of (8×8) pixels, in which case both row and column vector matrices A and B are also of an (8×8) order. Alternately, each (8×8) block of coefficients may be derived by taking into account pixels neighboring the corresponding pixel block to minimize block artifacts in the reproduced image. For example, referring to FIG. 4A, each block P of (8×8) coefficients may be derived by symmetrically expanding the corresponding (8×8) pixel block to provide a successive series of overlapping (16×16) pixel blocks P'. In this case, row vector matrix A is increased to an (8×16) matrix and column vector matrix B is increased to a (16×8) matrix. Each matrix multiplication A (8×16) * P(16×16) * B(16×8) yields an (8×8) block of spectral coefficients reflecting the corresponding kernel (8×8) pixel block P and including contributions from surrounding pixels.

Figure 5:
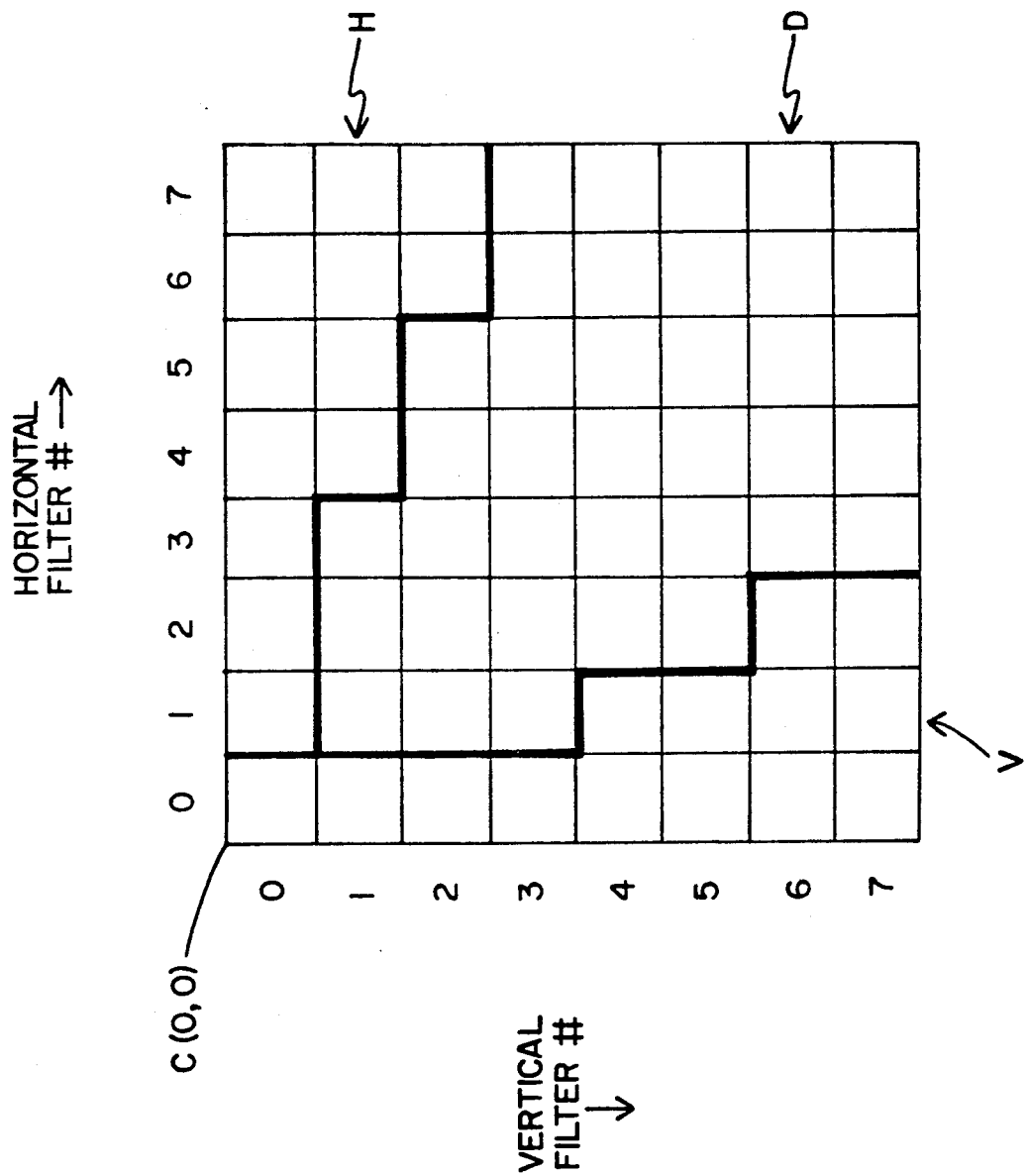
FIG. 5 is a graphical depiction of an (8×8) array of sub-band coefficients separated into horizontal, vertical and diagonal spatial regions.

Matrix multiplication is well known in the art. For row vector matrix A, each value in a row i of matrix A is multiplied with a corresponding pixel in a column j of matrix P and all of the products are summed to form a value R (i, j) in the resultant matrix. Thus, the values of row 1 of matrix A are multiplied with the corresponding pixels of column 1 of matrix P to derive value R (1,1) of the resultant matrix, and so on. For the column vector matrix B, each value in a column j is multiplied with a corresponding value in a row i of the resultant matrix to derive a coefficient C (i, j) of the transform coefficient matrix. An exemplary block of transform coefficients generated by block transform coder 45 is illustrated in FIG. 5. As shown, each block comprises 64 (8×8) coefficients, each of which represents a respective spatial frequency band of a corresponding pixel block, the lower order coefficients representing the lower spatial frequencies and the higher order coefficients representing the higher spatial frequencies. More specifically, the first coefficient C(0,0) represents the DC or average value of the corresponding pixel block. The coefficients extending horizontally and vertically from C (0,0) respectively represent the horizontal and vertical detail components of corresponding pixel block with increasing order as a function of their respective distances from C (0,0). Similarly, the coefficients extending diagonally from C (0,0) represent the diagonal detail components of the pixel increasing order as a function of their distances from C (0,0). Block transform coder 42 comprises a discrete cosine transform (DCT) block coder in the present embodiment but other block transform coders may also be used.

Figure 6:
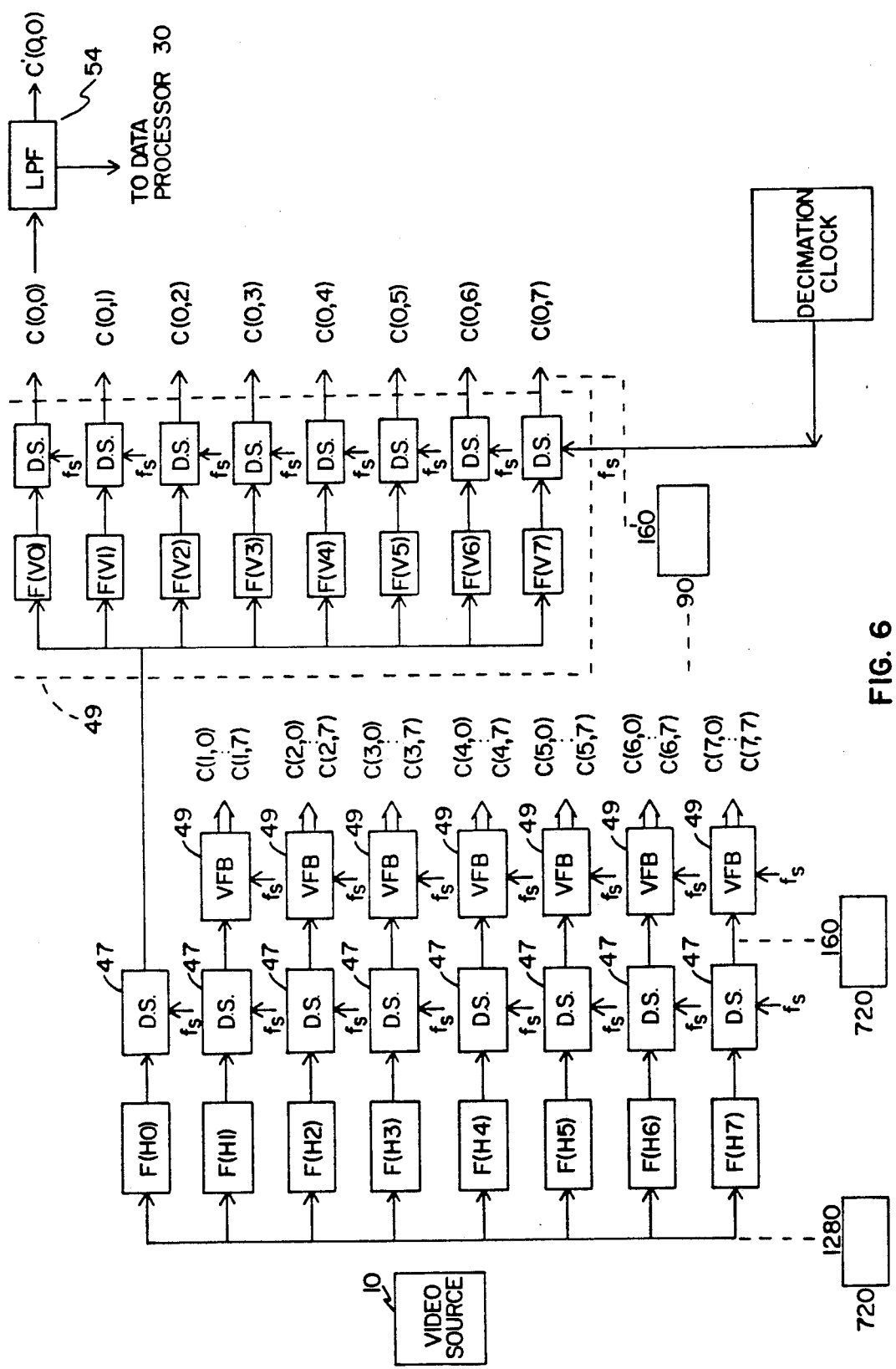
FIG. 6 is a block diagram showing the use of spatial filters to derive the sub-band coefficients of FIG. 5.

As mentioned previously, spatial filters can also be employed to derive coefficient blocks of the form illustrated in FIG. 5. Referring to FIG. 6, the 37 MHz video source 10 provides an output stream of pixels representing successive video frames each comprising 720 lines of 1280 pixels each. The source pixels are applied to a quadrature mirror filter bank comprising 8 parallel horizontal filters F(H0)-F(H7) which separate the 37 MHz source signal into 8 substantially equal horizontal frequency bands. Each horizontal band is down-sampled in a respective down-sampler 47 by a factor of 8 in response to a decimation clock signal $f_s$ to provide a series of 8 horizontally filtered components each comprising 720 lines of 160 pixels per frame. Each of the 8 horizontally filtered components is now applied to a respective vertical filter bank 49. Each vertical filter bank 49 comprises 8 filters F(V0)-F(V7) filtering the respective horizontal components into 8 vertical frequency bands, each of which is again down-sampled in a respective down-sampler 51 by a factor of 8 in response to decimation clock signal $f_s$. The vertical filter banks 49 thus provide 64 horizontally and vertically filtered output components each comprising 90 lines of 160 pixels per frame. Each of the output components comprises 14,400 terms/frame corresponding to a respective one of the transform coefficients derived in the transform coding implementation of the invention. For example, 14,400 (160×90) output terms representing the lowest horizontal and lowest vertical frequency bands are produced each frame. These components correspond to the 14,400 lowest order coefficients C(0,0) derived each frame in the transform coding implementation. That is, since each (8×8) pixel block results in a lowest order coefficient C(0,0), (1280×720/64) or 14,400 such coefficients are derived for each video frame. The terms produced by the vertical filters can be conveniently grouped to provide coefficient blocks as shown in FIG. 5. The axes of the coefficient block of FIG. 5 have been labeled with horizontal and vertical filter numbers to show how this grouping is accomplished.

Figure 7:
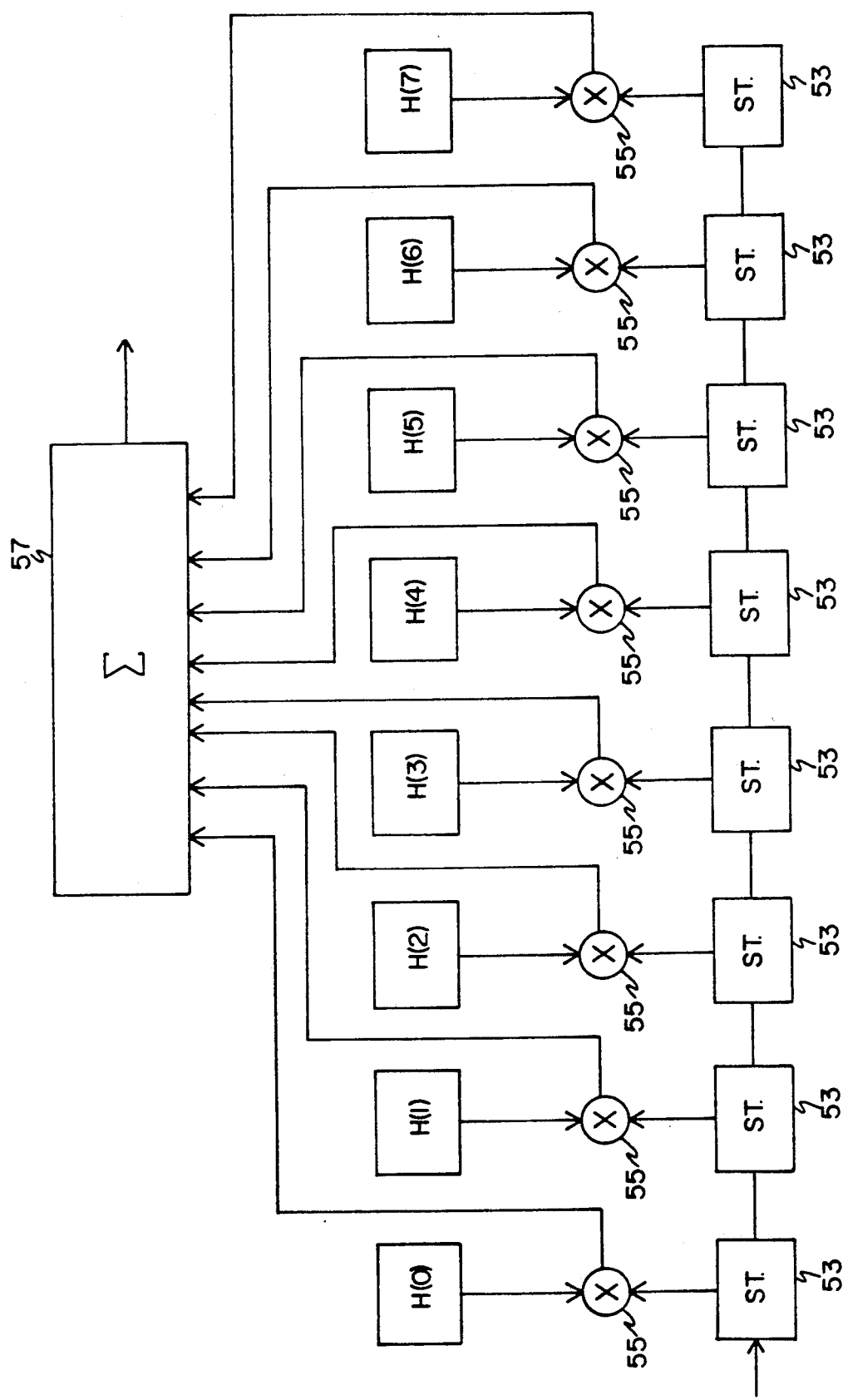
FIG. 7 is a block diagram of an exemplary spatial filter of FIG. 6.

Each of the filter and down-sample combinations of FIG. 6 is illustrated in more detail in FIG. 7. As shown, each filter comprises an 8-tap finite impulse response (FIR) filter including 8 storage elements 53 connected in a shift-register configuration. The output of each storage element 53 is coupled to a respective multiplier 55 where it is multiplied with a respective base function H(0)-H(7), with the products developed at the output taps of multipliers 55 being applied to the inputs of a summer 57. The sum of the products from all 8 taps provide the output filtered signal. The configuration of each of the filters in FIG. 6 may conform to the filter of FIG. 7, but with different base functions selected to achieve the desired frequency selectivity. Down-sampling is achieved by outputting every 8th value developed by the summer.

It will be recalled that in the transform coding implementation previously described each (8×8) pixel block could be symmetrically expanded, e.g. to (16×16), to derive 64 coefficients per block whose values reflected the (8×8) pixel block kernel as well as pixels in the vicinity of the (8×8) kernel. A similar result can be obtained in the filter implementation by increasing the length of the filters, e.g. by providing 16-tap filters. A corresponding increase in the down-sampling factor is, of course, also required. Increasing the filter length also increases the stop-band attenuation of each filter.

In order to reduce the power required to transmit the video signal with a given signal to noise ratio, the high energy content, low frequency component of the video source signal was removed therefrom by low frequency removal circuit 20 of FIG. 1 and coded for transmission as a digital signal prior to processing the video source signal in adaptive sub-band coder 40. Alternatively, the 37 MHz video source signal may be applied directly to adaptive sub-band coder 40 as indicated by dotted line 12 and the low frequency component removed after the sub-band coding operation has been effected. This may be most conveniently accomplished by low-pass filtering the C(0,0) coefficient terms which represent the band of horizontal frequencies of the video source signal from zero to about 4.5 MHz. For example, referring to FIG. 6, a low-pass filter 54 may be provided for removing the low-frequency component from the C(0,0) coefficients and thereby providing a modified low-order coefficient term C'(0,0). The low-frequency component is coupled to data processor 30 for processing as shown in FIG. 1.

The quadrature mirror filter bank illustrated in FIG. 6 separates the video source signal into eight substantially equal horizontal frequency bands. Each pair of adjacent bands overlap into each other cross-coupling aliasing terms from one band into the other. Theoretically, the aliasing terms cancel to allow perfect reconstruction of the signal. Some of the aliasing terms from the second band may also be present in the low frequency component coupled from low-pass filter 54 to data processor 30. However, these relatively high frequency terms are relatively low in magnitude and do not appreciably affect system operation. In addition, the ability to faithfully reconstruct the signal at the receiver is not at all compromised since whatever is removed at the transmitter is precisely re-inserted at the receiver.

The low-frequency component can also be removed after sub-band coding when such is accomplished by a block transform. As in the quadrature mirror filter embodiment of FIG. 6, a low-pass filter can be used to remove an appropriate band of frequencies from the C(0,0) coefficient terms generated by the block transform coder. In this case, the removed low frequency component may contain additional aliasing terms from some of the other upper horizontal bands.

As previously described, the coefficients provided by sub-band coder 42 require more bandwidth for transmission than is available in a standard 6 MHz television channel. A bandwidth reduction algorithm based on perceptual coding is therefore employed to truncate selected coefficients prior to transmission. According to this algorithm, which is implemented by image classifier 46, the distribution of each block of 64 coefficients C (i,j) developed by sub-band coder 42, except for coefficient C (0,0), is analyzed in terms of the three spatial regions H,V and D illustrated in FIG. 5. Region H comprises the coefficients representing the horizontal frequencies of the corresponding portion of the video image, region V the coefficients representing the vertical frequencies and region D the coefficients representing the diagonal frequencies. As mentioned previously, coefficient C (0,0) is a DC or average value term. Based on this analysis, image classifier 46 classifies the corresponding video image portion into one of five classes. Coefficient selector 44 is responsive to the assigned classification for truncating selected coefficients provided by sub-band coder 42. The non-truncated coefficients together with coefficient C (0,0) are then applied to multiplexer 50 for transmission. A data signal identifying the non-truncated coefficients is also developed by coefficient selector 44 and applied to data processor 30 and therefrom to multiplexer 50 for transmission.

Image classifier 46 classifies each coefficient block into one of the five following perceptual classes: (1) EDGE, (2) TEXTURE, (3) FLAT SPECTRUM, (4) LOW AC and (5) BOUNDARY. The classification is effected by image classifier 46 in accordance with the algorithm illustrated in flow chart form in FIGS. 8A and 8B.

Prior to actually executing the algorithm, image classifier 46 preferably applies a relatively light weighting function to each block of coefficients. This weighting function slightly reduces the values of the higher order coefficients relative to the lower order coefficients thereby slightly biasing the subsequent truncation algorithm in favor of retaining the coefficients corresponding to the lower spatial frequencies of the image. The weighting function may be applied to each coefficient block as illustrated in FIG. 10 (A), but with a more gradual fall-off of weighting factors.

Figure 8A:
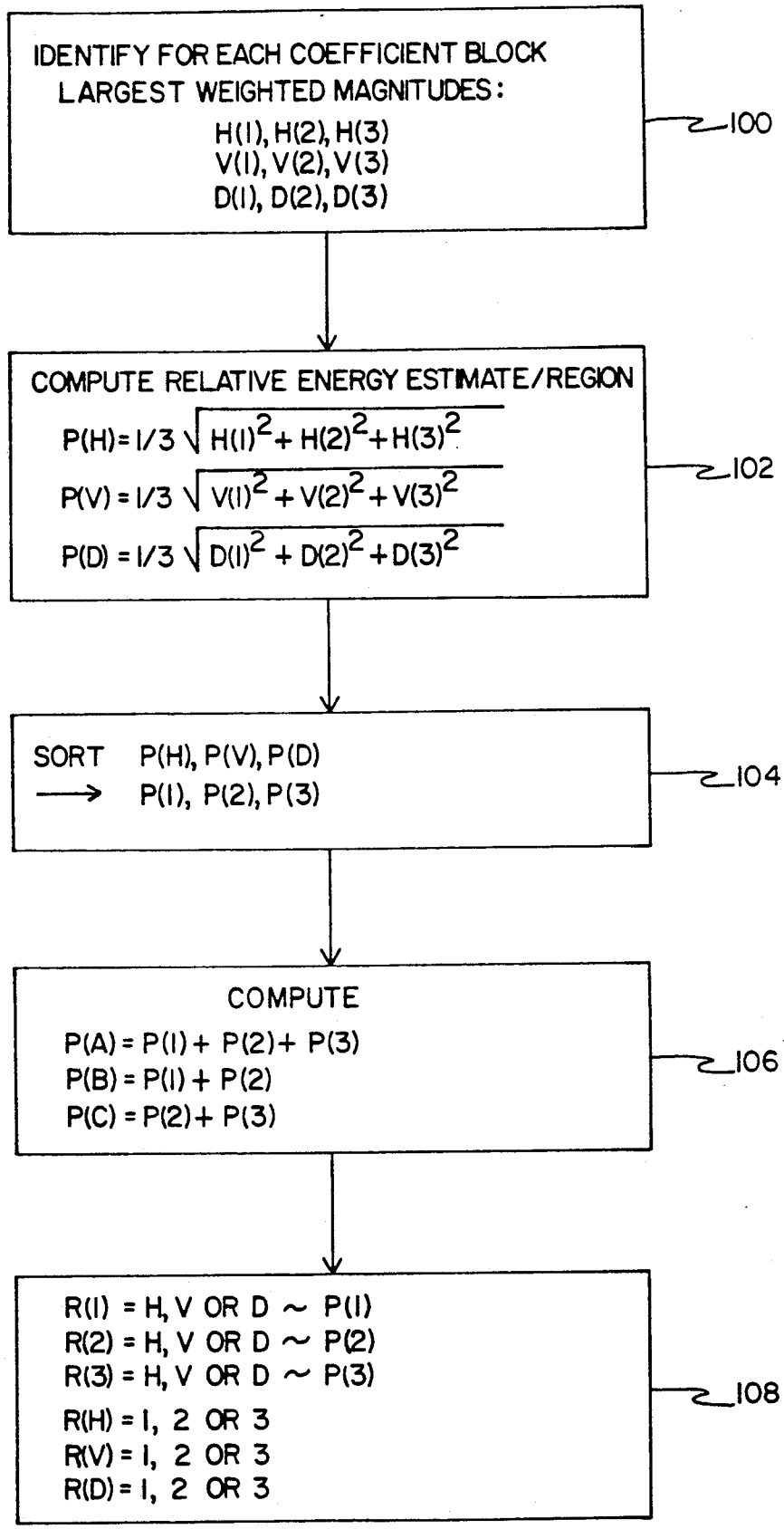
FIG. 8(A) and 8(B) are flow charts illustrating an algorithm for perceptually classifying the sub-band coefficients according to the invention.

Referring now to FIG. 8A, the weighted coefficients for each (8×8) coefficient block are initially examined in a step 100 and the 3 largest coefficients in magnitude for each of the spatial regions H, V and D are identified. This step thus identifies the 3 largest coefficients H(1), H(2) and H(3) for the H region, the 3 largest coefficients V(1), V(2) and V(3) for the V region and the 3 largest coefficients D(1), D(2) and D(3) for the D region. Using the values derived in step 100, the relative energy per region P(H), P(V) and P(D) is then estimated as shown at step 102. Alternatively, the relative regional energy estimations can be derived as follows: $P(H) = \frac{1}{3}[H(1) + H(2) + H(3)]$; $P(V) = \frac{1}{3}[V(1) + V(2) + V(3)]$; and $P(D) = \frac{1}{3}[D(1) + D(2) + D(3)]$. Next, in step 104 the 3 relative energy estimations P(H), P(V) and P(D) are sorted according to magnitude, the largest being denoted as P(1), the second largest as P(2) and the smallest as P(3). The combinations $P(A) = P(1) + P(2) + P(3)$, $P(B) = P(1) + P(2)$ and $P(C) = P(2) + P(3)$ are then computed in step 106. Finally, in step 108 a variable R(1) is set equal to the region H,V or D having the highest relative energy estimation as determined in step 104, variable R(2) is set equal to the region having the next highest relative energy estimation and R(3) is set equal to the region having the lowest relative energy estimation. Also, the relative regional energy estimations are ranked by magnitude by setting variables R(H), R(V) and R(D) equal to 1,2 or 3.

Figure 8B:
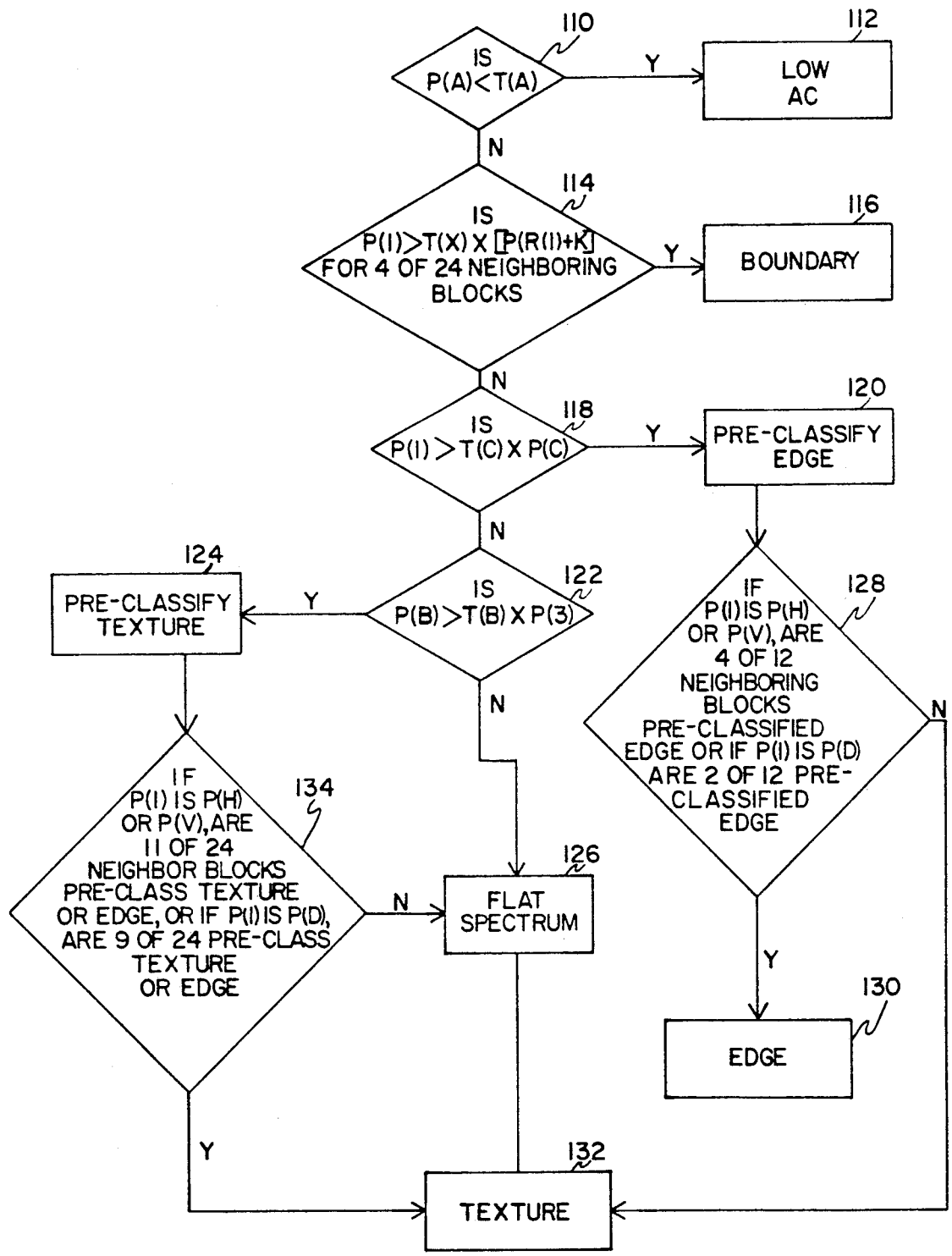

Referring now to FIG. 8B, the total regional energy estimation P(A) is initially compared to a first threshold T(A) in a step 110. If the total regional energy estimation P(A) is less than threshold T(A), indicating that the total energy estimation of the coefficient block is relatively low, the block is assigned a classification LOW-AC in step 112. If P(A) is greater than threshold T(A), a second test is performed at step 114 wherein the largest relative regional energy estimation P(1) for the block is compared to the largest relative regional energy estimations P(1) of the 24 neighboring blocks as illustrated in FIG. 9A. In particular, if P(1) of the block under analysis is greater than a second threshold T(X) multiplied by the quantity [P(R(1))+K], where K is a programmable offset factor, for 4 or more of the 24 neighboring blocks, then the block is classified as a BOUNDARY as shown at step 116. This classification denotes that the coefficient block comprises a relatively distinct boundary between two separate portions of the image. The programmable factor K is included in the calculation to insure that small differences in the video image do not result in BOUNDARY classifications.

The algorithm next proceeds to perform two pre-classification tests. First a test is performed at step 118 for comparing the largest relative regional energy estimation P(1) of the block to the relative energy estimations of the remaining two regions P(2) and P(3). In particular, if P(1) is greater than a third threshold T(C) multiplied by P(C), indicating that the energy in the coefficient block is predominantly in only one of the three regions H,V or D, the block is pre-classified as an EDGE at step 120. The EDGE classification denotes that the block is dominated by a large amount of video content in a single spatial direction; horizontal, vertical or diagonal. If P(1) is not greater than T(C) * P(C), a second pre-classification test is performed at step 122 in which the two largest relative regional energy estimations P(1) and P(2) are compared to the lowest relative regional energy estimation P(3). In particular, if P(B) is greater than a fourth threshold T(B) multiplied by P(3), indicating that two of the regions dominate the block's energy spectrum, the block is pre-classified as TEXTURE in step 124. This classification denotes that the block is dominated by a large amount of video content in two of the three spatial directions. If none of the foregoing tests are satisfied, the block is classified as FLAT SPECTRUM at step 126 which denotes that the block is characterized by relatively equal amounts of video content in all three spatial directions.

Further tests are performed on the EDGE and TEXTURE pre-classifications as follows. As indicated at step 128, if P(1) is either P(H) or P(V), i.e. the largest relative regional energy estimation of the block is either horizontal or vertical, the pre-classification assignments of twelve vertically or horizontally oriented neighboring coefficient blocks are checked as shown in FIG. 9B. If at least 4 of the 12 blocks are also pre-classified as EDGE, then the block is assigned a final EDGE classification at step 130. If P(1) is P(D), the block is finally assigned an EDGE classification if 2 of the 12 neighboring blocks in either of the diagonal orientations illustrated in FIG. 9C are also pre-classified as EDGE. If none of these conditions are satisfied, the block is finally classified as TEXTURE at step 132. These further tests are performed to prevent isolated EDGE classifications.

In the case of the TEXTURE pre-classification, a further test is performed at step 134 in which the pre-classification assignments of the 24 neighboring coefficients blocks (see FIG. 9(A)) are checked. If P(1) of the block is either P(H) or P(V), the block is assigned a final TEXTURE classification at step 132 if at least 11 of the 24 neighboring blocks were assigned EDGE or TEXTURE pre-classifications. Otherwise, the block is classified FLAT SPECTRUM at step 126. Similarly, if P(1) of the block is P(D), it is assigned a final TEXTURE classification at step 132 if at least 9 of the 24 neighboring blocks were assigned EDGE or TEXTURE pre-classifications and is otherwise finally classified as FLAT SPECTRUM at step 126.

The purpose of the foregoing classification algorithm is to allow bandwidth allocations to be made for the transmission of the coefficients based on perceptual coding criteria. In accordance with such criteria, it has been found that blocks classified as BOUNDARY should be allocated the largest transmission bandwidth (i.e. least amount of coefficient truncation) and that blocks classified as LOW AC should be allocated the least transmission bandwidth (i.e. greatest amount of coefficient truncation). Between these two extremes, transmission bandwidth is allocated as a function of the spatial distribution of the relative energy estimation characterizing the block. Thus, blocks classified as EDGE (energy distribution predominately in a single spatial direction) are allocated the next largest transmission bandwidth, blocks classified as TEXTURE (energy distribution predominately in two spatial directions) are allocated a smaller amount of transmission bandwidth and blocks classified as FLAT SPECTRUM (energy distribution relatively equal in all three spatial directions) are allocated yet a smaller amount of transmission bandwidth.

As the name suggests, the BOUNDARY classification indicates that the coefficient block under analysis represents a boundary edge between two distinct video regions. It has been found that if this boundary separates a region of video having good masking characteristics from a region having relatively poor masking characteristics, a visibly undesirable artifact (e.g. a shadow or halo) will be produced in the latter region of the reproduced image unless sufficient coefficients are transmitted to reproduce the boundary with relatively high accuracy. Maximum transmission bandwidth is therefore allocated for the BOUNDARY classification so that a relatively large number of coefficients from each of the three spatial regions H,V and D can be transmitted. As indicated above, coefficient blocks classified as LOW-AC are allocated minimum transmission bandwidth because of the low amount of AC energy represented thereby. However, video images represented by this classification provide little masking so that even small errors in the reproduced image may become perceptually visible. A minimum number of coefficients from all three spatial regions are therefore retained in order to insure proper reproduction of some low level detail.

The EDGE classification represents the existence of a large amount of image content in one of the three spatial regions H, V or D; this image content largely taking the form of edges in the corresponding direction. It is desirable to reproduce such edges with a relatively high degree of accuracy, so that a relatively large amount of bandwidth is allocated for images falling within this classification. The largest amount of the allocated bandwidth is used for the transmission of coefficients from the spatial region corresponding to the direction of the EDGE. However, due to the perceptual phenomenon of edge masking, i.e. noise in the immediate vicinity of a video edge is difficult to resolve, the number of coefficients in the direction of the edge can be somewhat reduced without significantly affecting the perceived resolution of the reproduced image in the direction of the edge. This reduction of the coefficients in the region corresponding to the direction of the edge allows for the transmission of a small number of coefficients from the other two regions for providing an increased degree of resolution in the reproduced image along the edge.

Coefficient blocks assigned the TEXTURE classification represent video images characterized by dominant energy in two of the three spatial regions. This condition is representative of highly textured video which serves to mask noise very well. As a consequence, the number of coefficients needed from the two dominant energy regions to reproduce the corresponding video without significantly affecting its perceived resolution can be substantially reduced. Also, only a very small number of coefficients from the third region are required. The FLAT SPECTRUM classification is assigned to coefficient blocks in which the energy distribution among the three spatial regions is highly uncorrellated. Video corresponding to these blocks is characterized by a noise-like quality, so that the coefficients in all three spatial regions can be equally reduced without significantly affecting the perceived resolution of the reproduced video image.

The classification assignment established by image classifier 46 for each pixel block is supplied to coefficient selector 44 (see FIG. 2) which, in response thereto, selectively truncates the coefficients provided by sub-band coder 42. Coefficient truncation is achieved by coefficient selector 44 in response to a pair of threshold values T(1) and T(2) and a weighting function. The coefficient magnitudes of each respective block are initially weighted as illustrated in FIG. 10 (A). As shown in this figure, the coefficients are weighted as a function of their distance from the D.C. term C(0,0). Thus, for the exemplary weighting function shown in FIG. 10(A), the coefficients closest to the DC term C(0,0) are weighted at a unity level, the coefficients next closest to term C(0,0) are weighted at 75%, the next group of coefficients at 50% and the final group at 25%. According to the invention, weighting is established as a function of block classification. Thus, five different functions may be used to weight a given coefficient block depending on its classification.

Figure 10B:
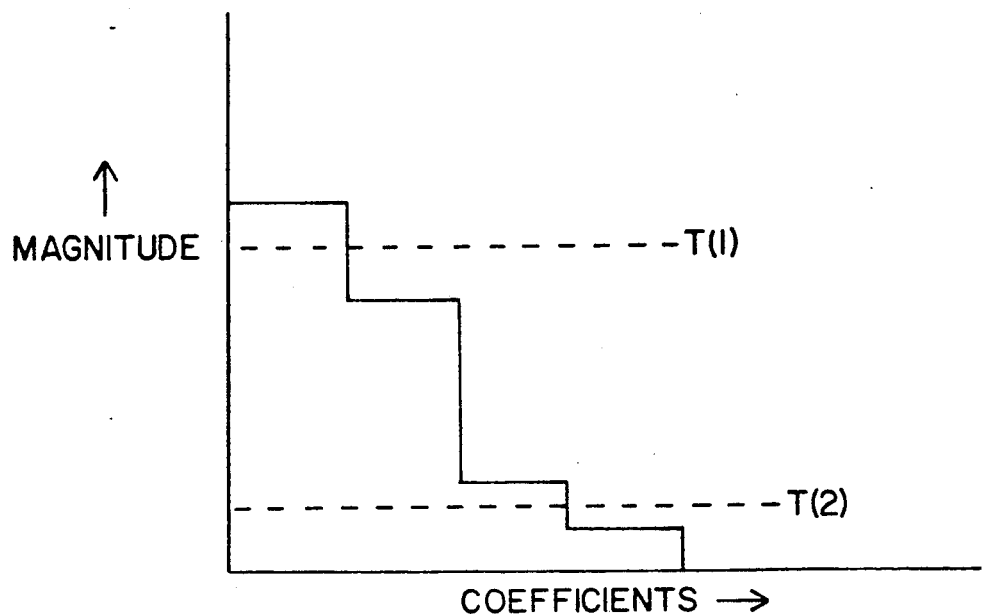
FIGS. 10(A) and 10(B) are graphical depictions illustrating the manner in which coefficient truncation is affected according to the invention.
Figure 10A:
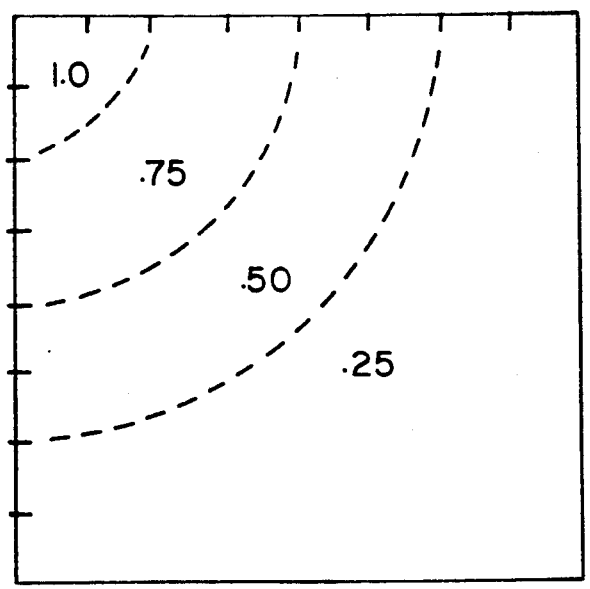

Referring to FIG. 10(B), after application of the weighting function as described above, the two truncation threshold values T (1) and T (2) are established for each region H, V, and D by coefficient selector 44. Threshold values T(2) provide a noise floor for each region and are derived as a function of block classification. Thus, for each block of coefficients 15 different values of T(2) are possible; five for each coefficient in the H region, five for each coefficient in the V region and five for each coefficient in the D region. Threshold values T(1) are relative values derived on the basis of coefficient magnitude. For all classifications other than EDGE, each value T(1) is derived as a function of block classification and the respective relative energy estimation P(H), P(V) or P(D). Each of these regional values for T(1) is derived such that it is less than or equal to the respective regional energy estimation P(H), P(V) or P(D). For the EDGE classification, each regional value of T(1) is derived as a function of the block classification and the respective maximum magnitude coefficient H(1), V(1) or D(1). Each of these regional values for T(1) is derived such that it is less than or equal to the respective maximum magnitude coefficient H(1), V(1) or D(1).

Coefficient selector 44 is operable for truncating the weighted coefficients of each region H, V and D whose magnitudes fall below either threshold T (1) or T (2) established for the respective region. Truncation is thus seen to be effected in response to both the weighting function and the thresholds T(1) and (2). For example, increasing relative threshold T(1) has the effect of increasing the extent of coefficient truncation and reducing its level has the effect of reducing the extent of coefficient truncation. Similarly, changing the weighting function will effect coefficient truncation by varying the coefficient magnitudes relative to thresholds T(1) and T(2). Coefficient truncation may therefore be effected by varying the thresholds T(1) and T(2) or by changing the weighting function, or a combination of both. In the exemplary representation of FIG. 10(B), all of the coefficients except those in the first group which have a magnitude greater than T(1) would be truncated. In the present implementation of coefficient selector 44, truncation is limited so that a maximum of 24 coefficients and a minimum of 1 coefficient is provided for each processed coefficient block, with 8 coefficients being provided on the average.

Relative threshold T(1) is particularly useful in cases where the coefficient block is characterized by a relatively small number of coefficients whose magnitudes are substantially larger than the magnitudes of the remaining coefficients. Since T(1) is a function of the magnitude of the largest coefficient, the smaller magnitude coefficients will be truncated, while the larger magnitude coefficients, representing the most important components of the video image, will be non-truncated. On the other hand, threshold T(2) is particularly useful in situations where the coefficient block is characterized by a relatively large number of substantially equal magnitude coefficients. It will be appreciated that in this case very little truncation will be effected by relative threshold T(1). Threshold T(2) is therefore provided to insure that a selected degree of coefficient truncation is effected under these conditions.

In addition to effecting coefficient truncation, coefficient selector 44 provides a data signal identifying the non-truncated coefficients supplied by the selector for transmission. This data signal will be subsequently used by receiver 70 to reconstruct a representation of the transmitted video image from the received coefficient blocks.

FIG. 11 is a block diagram illustrating an exemplary form of receiver 70. The transmitted signal including the sub-band coefficients and the data signal, is received and demodulated by a tuner stage 72. The output of tuner 72 thus includes the digital low frequency information, the transmitted coefficients and the data signal corresponding thereto. The digital low frequency information is coupled to a low frequency reconstruct circuit 74 which reconstructs the analog low frequency component of the original video source signal for application to one input of a summing circuit 76. The received coefficients are supplied to a coefficient memory 78 of sufficient size for storing 24 coefficients (the maximum number transmitted for each coefficient block). The data signal identifying the received coefficients is applied to one input of a coefficient block formatter 80, the second input of which is supplied with the received coefficients stored in memory 78.

Coefficient block formatter 80, in response to the data signal and the received coefficients stored in memory 78, reconstructs a coefficient block representing the corresponding original block, with each truncated coefficient being represented by a zero value term. The reconstructed coefficients are then applied to an inverse sub-band coder 82 which provides an output comprising a representation of the corresponding 8×8 pixel block. The reconstructed pixel block is stored in an 8-line memory 84 and applied therefrom to a second input of summer 76. In practice, it may be preferable to alternately read and write pixels from a pair of 8-line memories 84. Summer 76 combines the reconstructed low frequency signal from circuit 74 and the high frequency component from memory 84 to derive a composite signal which is then coupled to a display 86 for reproducing the image. The display is preferably progressively scanned and operated at a vertical rate equal to the NTSC field rate and at a horizontal rate equal to three times the NTSC horizontal rate.

Figure 12:
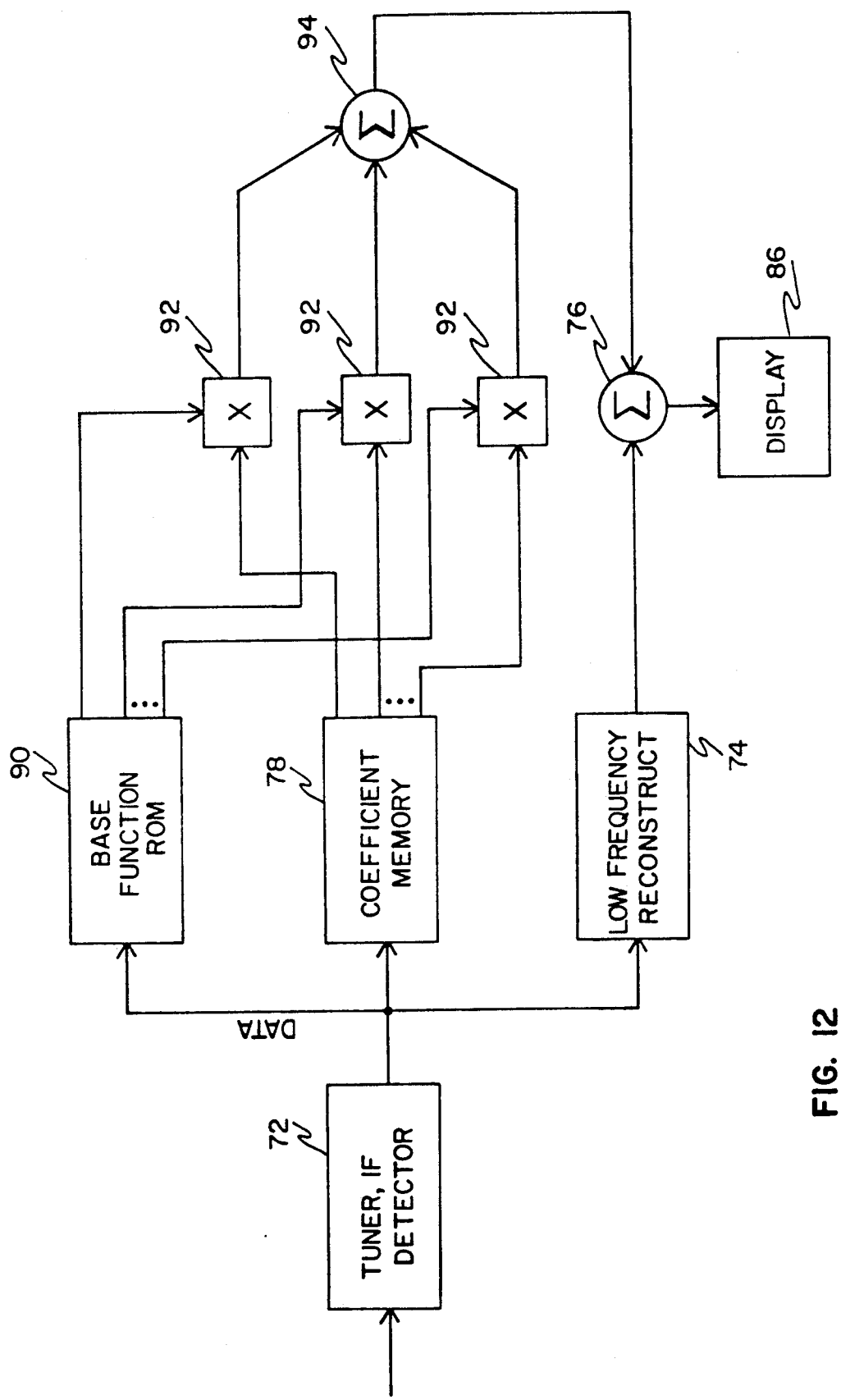
FIG. 12 is a block diagram showing an alternate embodiment of a receiver in accordance with the invention.

FIG. 12 is a block diagram showing an alternate embodiment of the receiver of FIG. 11. Much of the circuitry in the embodiment of FIG. 12 is the same as that used in FIG. 11, the main exception being the circuit used to derive the pixels from the received coefficients and data. In the receiver of FIG. 12, a base function ROM 90 is provided for storing a plurality of base functions. Each base function stored in ROM 90 is the inverse of a respective base function used by the sub-band coder 42 in the transmitter to derive a particular coefficient. Thus, in the preferred embodiment of the invention, 64 base functions are stored in ROM 90. Each stored base function is selectively applied to the first input of one of 24 multipliers 92, 24 multipliers being provided to accommodate the maximum number of coefficients which can be transmitted for each coefficient block. Each of the 24 coefficient storage locations of coefficient memory 78 is coupled to a second input of a respective one of the multipliers 92.

The received data signal controls base function ROM 90 such that corresponding stored base functions and coefficients are supplied to respective multipliers 92. The multipliers 92 thereby perform the appropriate inverse transformation for each received coefficient for producing a plurality of outputs which, when combined in a summer 94, provide a representation of the high frequency video component. By appropriately applying the outputs of base function ROM 90 and coefficient memory 78 to multipliers 92 the output of summer 94 can be made to represent real-time video in raster scan format, eliminating the need for memory 84 of the FIG. 11 embodiment. As in the embodiment of FIG. 11, the high frequency video component is combined with the low frequency video component in summer 76 to provide a composite signal for driving display 86.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. The method comprising developing a video information signal comprising a sequency domain representation of a first video component of a video image signal and a time domain representation of a second video component of the video image signal.

2. The method of claim 1 including providing said video information signal in the form of successive frames of scanning lines, each successive pair of said frames being separated by a plurality of vertical retrace lines, and transmitting said sequency domain representation during said scanning lines and said time domain representation during said retain lines.

3. The method of processing a video information signal comprising:
   sub-band coding the video information signal to derive a plurality of spectral coefficients representative thereof;
   transmitting a first portion of the information represented by said coefficients during the horizontal scanning lines of a video transmission signal; and
   transmitting a second portion of the information represented by said coefficients during the vertical retrace lines of said video transmission signal.

4. The method of processing a video information signal comprising:
   sub-band coding said video information signal to develop a plurality of spectral coefficients representative thereof; and
   transmitting at least some of the information represented by said coefficients during the vertical retrace lines of a video transmission signal.

5. The method of processing a video image signal comprising:
   sub-band coding the video image signal to develop a plurality of spectral coefficients representative thereof; and
   processing the developed spectral coefficients for deriving an analog signal comprising a plurality of spectral coefficients representing a band of video frequencies of said video image signal having a relatively low energy content and a digital signal representing a band of video frequencies of said video image signal having a relatively high energy content.

6. The method of processing a video image signal comprising:
   developing a plurality of sub-band coded spectral coefficients representing a relatively low energy component of the video image signal;
   developing a digital signal representing a relatively high energy component of the video image signal;
   transmitting said spectral coefficients during the horizontal scanning lines of a video transmission signal; and
   transmitting said digital signal during the vertical retrace lines of said video transmission signal.

7. The method of claim 6 including providing said spectral coefficients in groups, each group of coefficients comprising a spectral representation of a respective spatial portion of the low energy component of said video image signal, analyzing the coefficients in each group of coefficients for estimating the relative energy distribution of the respective group in a plurality of different spatial directions and selectively reducing the bandwidth required for transmission of each group of coefficients in response to said analyzing step.

8. The method of claim 7 wherein said analyzing step comprising analyzing the coefficients in a given group of coefficients for determining the number of said different spatial directions over which the estimated relative energy of the group is predominately distributed.

9. The method of claim 8 including selectively reducing the bandwidth required for transmission of said given group of coefficients in direct relation to said number.

10. The method of claim 7 wherein said analyzing step comprises comparing the estimated relative energy in one or more of said different spatial directions of a given group of coefficients with the estimated relative energy in one or more of said different spatial directions of at least one other group of coefficients derived for a portion of said video image neighboring the portion corresponding to said given group.

11. The method of claim 10 including selectively reducing the bandwidth required for transmission of said given group of coefficients in response to said comparison.

12. The method of claim 7 wherein said analyzing step comprises assigning one of a plurality of perceptual classifications to each of said groups of coefficients in response to said analyzing step.

13. The method of claim 12 including selectively reducing the bandwidth required for transmission of each group of coefficients in response to the classification assigned thereto.

14. The method of claim 13 wherein said reducing step comprises establishing a first and a second threshold for each of said groups of coefficients in response to the classification assigned to the respective group, said first threshold being additionally established in relation to a characteristic of one or more of the coefficients of the respective group, and selectively reducing the bandwidth required for transmission of each group of coefficients in response to the first and second thresholds established therefore.

15. The method of claim 14 wherein said reducing step comprises truncating the coefficients of each group having a magnitude less than either the first or the second threshold established for the respective group.

16. The method of claim 7 wherein said analyzing step includes analyzing the coefficients in each of said groups of coefficients for detecting the presence of a distinct image boundary between adjacent spatial image portions, and reducing the bandwidth required for transmission of the corresponding groups of coefficients by a relatively small amount.

17. A method of processing a signal representing a source video image, comprising the steps of:
sub-band coding said signal for deriving a plurality of groups of spectral coefficients, each of said groups representing a respective spatial portion of said video image;
determining the distribution among a plurality of different spatial regions of a predetermined characteristic of at least some of the coefficients in each of said groups of coefficients, said plurality of different spatial regions comprising a first region representing horizontal information of said video image, a second region representing vertical information of said video image and a third region representing diagonal information of said video image; and
classifying each of said groups of coefficients in accordance with the distribution determined for the respective group.

18. The method of claim 17 including selectively reducing the bandwidth required for the transmission of each of said groups of coefficients in accordance with the classification assigned thereto.

19. A method of processing a signal representing a source video image, comprising the steps of:
sub-band coding said signal for deriving a plurality of groups of spectral coefficients, each of said groups representing a respective spatial portion of said video image;
determining the relative estimated energy distribution of the coefficients of each of said groups of coefficients over a plurality of different spatial regions, said plurality of different spatial regions comprising a first region representing horizontal information of said video image, a second region representing vertical information of said video image and a third region representing diagonal information of said video image;
classifying each of said groups of coefficients in accordance with the distribution determined for the respective group; and
selectively reducing the bandwidth required for the transmission of each of said groups of coefficients in accordance with the classification assigned thereto.

20. The method of claim 19 wherein said classifying step comprises determining the number of said different spatial regions over which the estimated relative energy of a group of coefficients is predominantly distributed and wherein said reducing step comprises reducing the bandwidth required for transmission of the respective group in direct dependence upon said number.

21. A method of processing a signal representing a source video image, comprising the steps of:
sub-band coding said signal for deriving a plurality of groups of spectral coefficients, each of said groups representing a respective portion of said video image;
determining the relative estimated energy distribution of the coefficients of each of said groups of coefficients over a plurality of different spatial regions,
classifying each of said groups of coefficients in accordance with the distribution determined for the respective group, including comparing the estimated relative energy in one or more of said different spatial regions of a given group of coefficients with the estimated relative energy in one or more of said different spatial regions of at least one other group of coefficients derived for a portion of said video image neighboring the potion corresponding to said given group; and
selectively reducing the bandwidth required for the transmission of each of said groups of coefficients in accordance with the classification assigned thereto.

22. The method of claim 21 wherein said comparing step comprises detecting the presence of a distinct image boundary between adjacent spatial image portions and wherein said reducing step comprises reducing the bandwidth required for transmission of the respective group by a relatively small amount.

23. A method of processing a signal representing a source video image, comprising the steps of:
sub-band coding said signal for deriving a plurality of groups of spectral coefficients, each of said groups representing a respective portion of said video image;
determining the relative estimated energy distribution of the coefficients of each of said groups of coefficients over a plurality of different spatial regions;
classifying each of said groups of coefficients in accordance with the distribution determined for the respective group, including classifying a given group of coefficients in relation to the classifications assigned to a plurality of groups of coefficients derived for respective portions of said video image neighboring the portion corresponding to said given group and
selectively reducing the bandwidth required for the transmission of each of said groups of coefficients in accordance with the classification assigned thereto.

24. A method of processing a signal representing a source video image, comprising the steps of:
sub-band coding said signal for deriving a plurality of groups of spectral coefficients, each of said groups representing a respective portion of said video image;
determining the relative estimated energy distribution of the coefficients of each of said groups of coefficients over a plurality of different spatial regions;
classifying each of said groups of coefficients in accordance with the distribution determined for the respective group;
establishing a first and a second threshold for each of said groups of coefficients in response to the classification assigned to the respective group, said first threshold being additionally established in relation to a characteristic of one or more of the coefficients of the respective group; and selectively reducing the bandwidth required for transmission of each group of coefficients in response to the first and second thresholds established therefor.

25. The method of claim 24 wherein said reducing step comprises truncating the coefficients of each group having a magnitude less than either the first or the second threshold established for the respective group.

26. A method of processing a signal representing a source video image, comprising the steps of:
sub-band coding said signal for deriving a plurality of groups of spectral coefficients, each of said groups representing a respective portion of said video image;
determining the relative estimated energy distribution of the coefficients of each of said groups of coefficients over a plurality of different spatial regions;
classifying each of said groups of coefficients in accordance with the distribution determined for the respective group;
establishing respective first and second thresholds for each of said spatial regions of each of said groups of coefficients in response to the classification assigned to the respective group, said first thresholds being additionally established in relation to a characteristic of one or more of the coefficients of the respective region; and
selectively reducing the bandwidth required for the transmission of the coefficients of each spatial region of each group in response to the first and second thresholds established therefor.

27. The method of claim 26 wherein said reducing step comprises truncating the coefficients of each spatial region of each group of coefficients having a magnitude less than either the first or second threshold established therefor.

28. A method of processing a signal representing a source video image, comprising the steps of:
sub-band coding said signal for deriving a plurality of groups of spectral coefficients, each of said groups representing a respective portion of said video image;
determining the relative estimated energy distribution of the coefficients of each of said groups of coefficients over a plurality of different spatial regions;
classifying each of said groups of coefficients in accordance with the distribution determined for the respective group;
selectively reducing the bandwidth required for the transmission of each of said groups of coefficients in accordance with the classification assigned thereto;
deriving a data signal representing the bandwidth reduction effected for each of said groups of coefficients; and
transmitting said data signal and said bandwidth reduced groups of coefficients through a channel of limited bandwidth.

29. The method of claim 28 including receiving said transmitted data signal and said bandwidth reduced groups of coefficients and reproducing a video image representing said source video image in response thereto.

30. The method of claim 29 wherein said reproducing step comprises storing said received coefficients and processing the stored coefficients in response to the received data signal for reproducing said video image representing said source video image.

31. The method of claim 30 wherein said processing step comprises subjecting said stored coefficients to an operation comprising the inverse of said sub-band coding step to derive a plurality of video pixels representing said source video image.

32. The method of claim 31 wherein said processing step comprises storing said derived pixels in a memory having less than a frame of pixel storage locations.

33. The method of claim 31 wherein said processing step comprises multiplying each of the stored coefficients with a respective base function to derive said plurality of video pixels.

34. The method of claim 19 including transmitting said bandwidth reduced groups of coefficients through a channel of limited bandwidth, receiving said transmitted bandwidth reduced groups of coefficients and reproducing a video image representing said source video image in response thereto.

35. A method of receiving a transmitted signal representing a video image, said transmitted signal comprising a sequency domain representation of a first video component of the video image signal and a time domain representation of a second video component of the video image signal, said method comprising the steps of receiving said transmitted signal, separating said sequency and time domain representations of said received signal, separately processing said sequency and time domain representations for providing respective first and second processed time domain signals and combining said first and second processed time domain signals for providing a third processed signal representing said video image.

36. A method of receiving a transmitted signal representing a video image, said transmitted signal comprising a plurality of successive frames of scanning lines, each successive pair of said frames being separated by a plurality of vertical retrace lines, said scanning lines including a sequency domain representation of a first component of said video image and said retrace lines including a time domain representation of a second component of said video image, said method comprising the steps of receiving said transmitted signal, separating said scanning and retrace lines of said received signal, processing said scanning lines for deriving a first processed time domain signal in response to said sequency domain representation, processing said retrace lines for deriving a second processed time domain signal in response to said time domain representation and combining said first and second processed time domain signals for providing a third processed signal representing said video image.

37. A method of receiving a transmitted video image signal, said transmitted signal including an analog signal comprising a plurality of sub-band coded spectral coefficients representing a relatively low energy video component of said video image signal and a digital signal representing a relatively high energy video component of said video image signal, said method comprising the steps of receiving said transmitted signal, separating said spectral coefficients and said digital signal from said received signal, processing said separated spectral coefficients for deriving a first processed time domain signal representing said relatively low energy component of said video image signal, processing said separated digital signal for deriving a second processed time domain signal representing said relatively high energy component of said video image signal and combining said first and second processed time domain signals for providing a third time domain signal representing said video image signal.

38. A video signal transmitted system comprising means for transmitting a signal representing a video image, said transmitted signal comprising a sequency domain representation of a first video component of the video image signal and a time domain representation of a second video component of the video image signal, means for receiving said transmitted signal, means for separating said sequency and time domain representations of said received signal, means for processing said sequency and time domain representations for providing respective first and second processed time domain signals and means for combining said first and second processed time domain signals for providing a third processed signal representing said video image.

39. A video signal transmission system comprising means for transmitting a signal representing a video image, said transmitted signal comprising a plurality of successive frames of scanning lines, each successive pair of said frames being separated by a plurality of vertical retrace lines, said scanning lines including a sequency domain representation of a first component of said video image and said retrace lines including a time domain representation of a second component of said video image, means for receiving said transmitted signal, means for separating said scanning and retrace lines of said received signal, means for processing said scanning lines for deriving a first processed time domain signal in response to said sequency domain representation, means for processing said retrace lines for deriving a second processed time domain signal in response to said time domain representation and means for combining said first and second processed time domain signals for providing a third processed signal representing said video image.

40. A video signal transmitted system comprising means for transmitting a video image signal, said transmitted signal including an analog signal comprising a plurality of sub-band coded spectral coefficients representing a relatively low energy video component of said video image signal and a digital signal representing a relatively high energy video component of said video image signal, means for receiving said transmitted signal, means for separating said spectral coefficients and said digital signal from said received signal, means for processing said separated spectral coefficients for deriving a first processed time domain signal representing said relatively low energy component of said video image signal, means for processing said separated digital signal for deriving a second processed time domain signal representing said relatively high energy component of said video image signal and means for combining said first and second processed time domain signals for providing a third time domain signal representing said video image signal.

41. A video signal transmission system comprising:
means for sub-band coding a signal representing a source video image for deriving a plurality of groups of spectral coefficients, each of said groups representing a respective portion of said video image;
means for determining the distribution among a plurality of different spatial regions of a predetermined characteristic of at least some of the coefficients in each of said groups of coefficients, said plurality of different spatial regions comprising a first region representing horizontal information of said video image, a second region representing vertical information of said video image and a third region representing diagonal information of said video image;
means for selectively reducing the bandwidth required for the transmission of each of said groups of coefficients in response to said determining means;
means for transmitting said bandwidth reduced groups of coefficients through a channel of limited bandwidth;
means for receiving said transmitted bandwidth reduced groups of coefficients; and
means responsive to said received bandwidth reduced groups of coefficients for reproducing a video image representing said source video image.

42. The system of claim 41 including means for generating a data signal representing the bandwidth reduction effected for each of said groups of coefficients and wherein said transmitting and receiving means are respectively operable for transmitting and receiving said data signal, said reproducing means being responsive to said received data signal and to said received bandwidth reduced groups of coefficients for reproducing a video image representing said source video image.

43. Apparatus for receiving a transmitted signal representing a video image, said transmitted signal comprising a sequency domain representation of a first video component of the video image and a time domain representation of a second video component of the video image, comprising: means for receiving said transmitted signal, means for separating said sequency and time domain representations of said received signal, means for separately processing said sequency and time domain representations for providing respective first and second processed time domain signals and means for combining said first and second processed time domain signals for providing a third processed signal representing said video image.

44. Apparatus for receiving a transmitted signal representing a video image, said transmitted signal comprising a plurality of successive frames of scanning lines, each successive pair of said frames being separated by a plurality of vertical retrace lines, said scanning lines including a sequency domain representation of a first component of said video image and said retrace lines including a time domain representation of a second component of said video image, comprising: means for receiving said transmitted signal, means for separating said scanning and retrace lines of said received signal, means for processing said scanning lines for deriving a first processed time domain signal in response to said sequency domain representation, means for processing said retrace lines for deriving a second processed time domain signal in response to said time domain representation and means for combining said first and second processed time domain signals for providing a third processed signal representing said video image.

45. Apparatus for receiving a transmitted video image signal, said transmitted signal including an analog signal comprising a plurality of sub-band coded spectral coefficients representing a relatively low energy video component of said video image signal and a digital signal representing a relatively high energy video component of said video image signal, comprising: means for receiving said transmitted signal, means for separating said spectral coefficients and said digital signal from said received signal, means for processing said separated spectral coefficients for deriving a first processed time domain signal representing said relatively low energy component of said video image signal, means for processing said separated digital signal for deriving a second processed time domain signal representing said relatively high energy component of said video image signal and means for combining said first and second processed time domain signals for providing a third time domain signal representing said video image signal.

* * * * *